United States Patent

[11] 3,536,053

| [72] | Inventors | Edward T. Vitcha<br>Mentor;<br>Leslie A. Hooker, Kirtland, and Richard P.<br>Lauder, Mentor, Ohio |
|---|---|---|
| [21] | Appl. No. | 677,554 |
| [22] | Filed | Oct. 24, 1967 |
| [45] | Patented | Oct. 27, 1970 |
| [73] | Assignee | TRW Inc.<br>Cleveland, Ohio<br>a corporation of Ohio |

[54] FORGED VALVES FROM CAST SLUGS
6 Claims, 8 Drawing Figs.

[52] U.S. Cl. ............................................. 123/188,
29/156.7
[51] Int. Cl. ..................................... F01l 3/02,
B21k 1/20, B23p 13/00
[50] Field of Search .......................................... 123/188AA,
188A, 188; 29/156.7

[56] References Cited
UNITED STATES PATENTS

| 1,351,949 | 9/1920 | Fuchs ........................... | 29/156.7 |
| 1,644,021 | 10/1927 | Knudsen ...................... | 29/156.7X |
| 2,162,063 | 6/1939 | Crawford ..................... | 123/188 |

*Primary Examiner*—Wendell E. Burns
*Attorney*—Hill, Sherman, Meroni, Gross & Simpson

ABSTRACT: Improved poppet valves for internal combustion engines produced by forging a cast slug, the configuration of the slug, and the casting conditions being such that the resulting forged valve has a grain structure in selected portions of the valve best suited to meet the type of stresses which the valve will encounter in use.

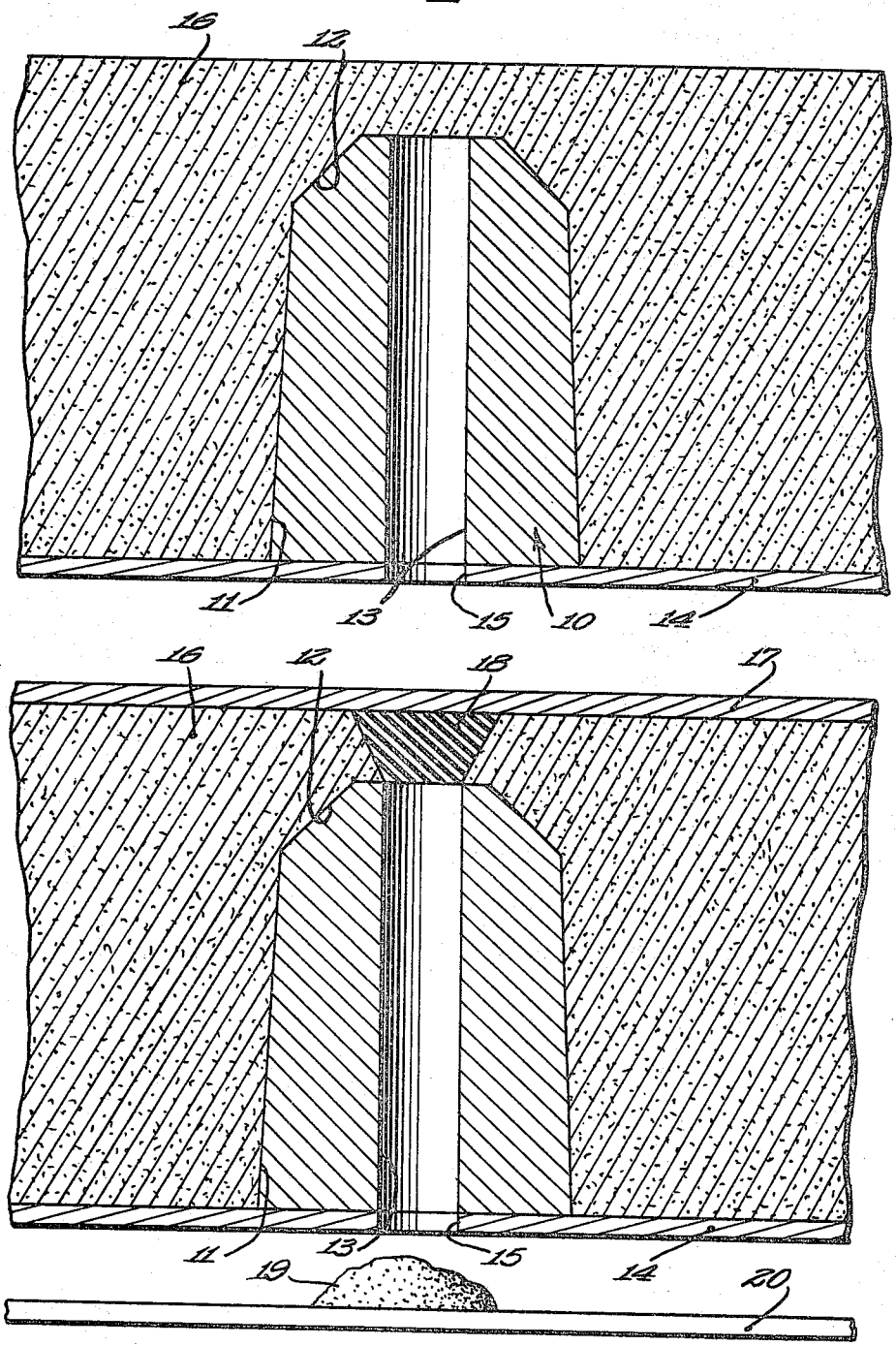

Inventors
Edward T. Vitcha
Leslie A. Hooker
Richard P. Lauder 3,536,053

FORGED VALVES FROM CAST SLUGS

BACKGROUND OF THE INVENTION

1. Field of the Invention

This invention deals with the field of exhaust valves for internal combustion engines. During the operation of an engine, an exhaust valve is subjected to creep, thermal shock and fatigue at elevated temperatures. The temperature of the outer diameter of the head may go as high as 1100°F. For satisfactory performance of the valve, the outer diameter of the head portion should have a desirable microstructure and sufficient strength to withstand mechanical and thermal stresses. The center of the head in use is subjected to temperatures as high as 1400°F. For a good performance of the valve, it is necessary that this portion should have good creep strength. The stem of the valve must have good ductility so that it can resist essentially shock loads due to the spring action in snapping the valve into the closed position. All of these desired characteristics are coupled with the requirement that the valve have a good surface finish and substantial freedom from inclusions.

2. Description of the Prior Art

Generally, valves are made starting with a billet derived from a large ingot, and reduced to a cylindrical blank from which the stem of the valve is extruded and the head is formed by upsetting. There is an inherent limitation in the size of the blank which can be used, since the overall reduction in cross-sectional area in extruding the stem is limited, and the amount of upset in making the head is limited. If these limits are not observed, either tool life suffers or else the material fails in shear and ruptures result.

In the formation of the initial ingot at the mill, the large size of the ingot results in slow cooling rates and the production of coarse dendrites. The chemical segregation occuring, particularly on high alloy steels, materially reduces the amount of reduction that can be accomplished without edge or internal cracking. There is also the problem of mold reactions occurring because of the large quantities of heat which must be transferred over prolonged periods of time when the steel ingots are solidifying.

SUMMARY OF THE INVENTION

The valve of the present invention is made by first casting the valve alloy under controlled conditions to form a slug which is generally cylindrical and has a chamfered nose portion. Particularly good results are obtained when the cast metal is subjected to directional solidification so that the body of the valve which is to form the head contains a fine columnar structure which is retained during the subsequent forging operation. The preferred embodiment of the invention also makes use of a special type of molding sand, including zirconium silicate sand and an inhibitor such as ethylene glycol which inhibits mold reaction and provides a good surface finish to the cast slug. The method of filling the mold is also important as it has been found desirable to introduce the molten metal upwardly into the casting cavity through an ingate of restricted cross-sectional area. Subsequent forging of this type of blank produces a valve which has the type of microstructure best suited for resisting the stresses which occur in the operation of the valve. Specifically, the extrusion of the slug results in a valve having a stem portion with a wrought-type structure, a head portion whose center has a cast structure and a seat portion in which the microstructure is partly cast and partly wrought.

BRIEF DESCRIPTION OF THE DRAWINGS

FIG. 1 is a somewhat schematic view of a mold-making assembly which can be used in accordance with the present invention;

FIG. 2 is a view similar to FIG. 1 but illustrating the mold-making elements in the succeeding portion of the mold-making process;

DESCRIPTION OF THE PREFERRED EMBODIMENTS

Figure 3:
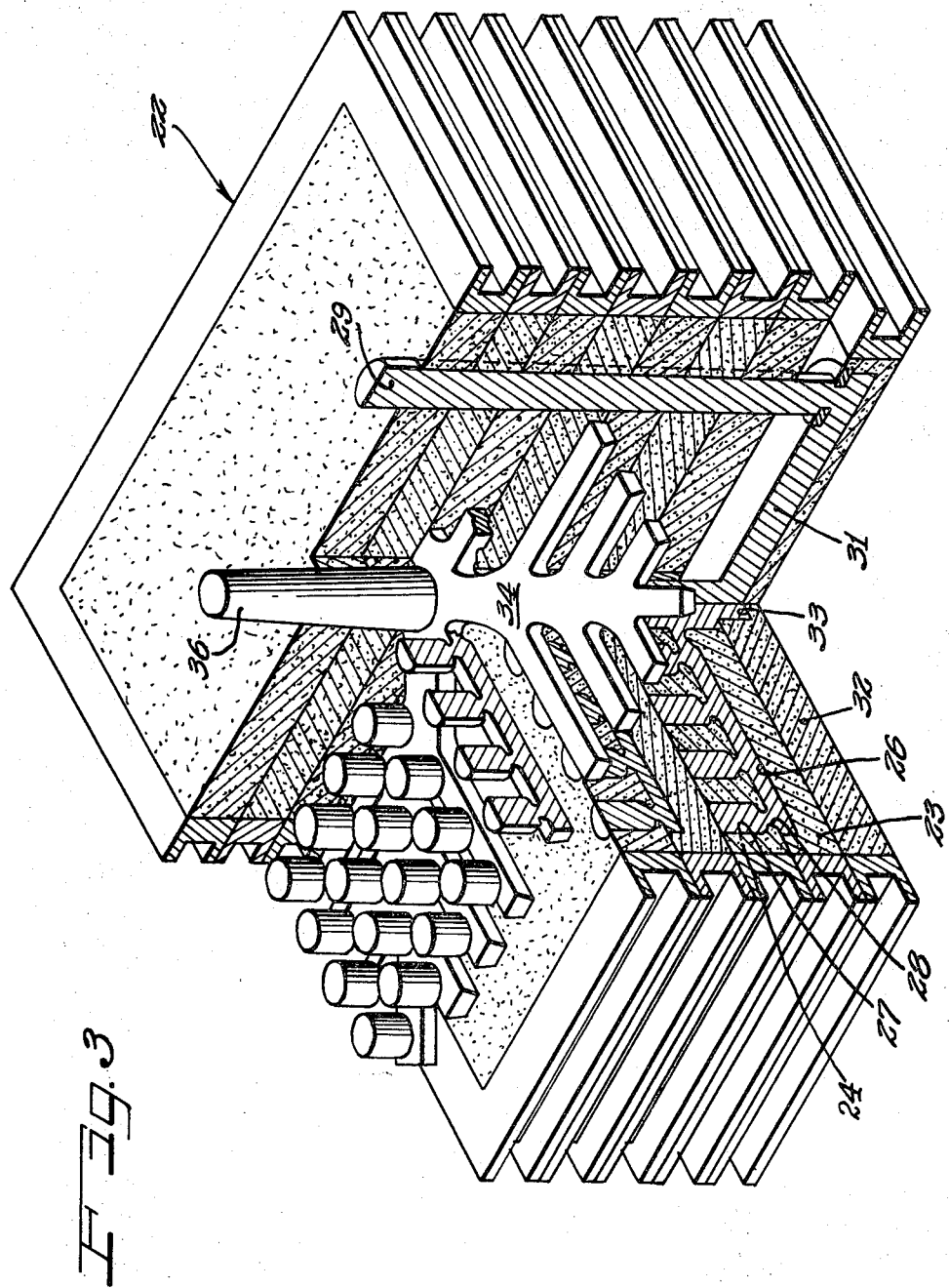
FIG. 3 is an isometric view, partly broken away for purposes of illustration, illustrating the molding assembly which can be used to provide the cast slugs of the present invention.

The first step in the overall process of making the valves is to provide a molding assembly for producing the cast slug which is to be forged into the valve. As mentioned previously, it is desirable in the process of the present invention to provide a cast slug which is generally cylindrical and has a chamfered nose or leading end portion. At the same time it is desirable to provide a mold in which there is a reverse taper at the ingate portion so that the metal sprue solidifying in this area can be readily removed by fracturing. The provision of a reverse taper, however, leads to difficulties in the original making of the mold from the pattern. To overcome these difficulties, we have employed a type of mold-making apparatus as shown in FIGS. 1 and 2 of the drawings.

In FIG. 1, reference numeral 10 identifies a pattern having a cylindrical body portion 11 and a chamfered portion 12 at one end. An axial passage 13 is provided within the pattern 10. The pattern 10 is supported on a lower pattern plate 14 which has an aperture 15 communicating with the passage 13 in the pattern 10. The green sand molding mixture identified at reference numeral 16 is then packed around the entire pattern. Following the application of the molding mixture to the pattern, the entire assembly is then compressed by means of an upper pattern plate 17 which has a resilient plug 18 composed of rubber or the like of suitable dimensions to be received tightly within the axial passage 13 of the pattern 10. The resilient plug 18 thereby forces a deposit of the molding sand 19 through the axial passage 13, depositing it on a surface 20. The presence of the axial passage 13 results in very little deformation of plug 18, insuring an adequate wall thickness for the ingate which resists metal washout. This is very desirable for subsequent slug removal and control of slug quality. By removal of the pattern and the resilient plug from the molding assembly, a clean, sharp ingate is produced through the use of a single flask, instead of using a more cumbersome cope and drag type assembly.

The type of molding sand employed has a definite effect upon the quality of the valve produced. By using green sands which are primarily silica, a variety of metal mold reactions may occur, creating pores on the surface of the cast slug. These defects produce a general surface roughness and may lead to forging ruptures. The use of such sands may also generate a slag or nonmetallic discontinuity which may penetrate from 10 to 20 mils below the surface of the castings. These defects result in weak points in the metal structure of the slugs.

It has now been found that the occurrence of the metal-mold reaction can be virtually eliminated by employing a sand mixture which contains zircon (zirconium silicate sand) together with a binder such as bentonite, a small amount of water, and an inhibitor such as ethylene glycol. Specifically, it has been found that a composition which includes 95 to 97 percent by weight zircon sand, 2 to 3 percent western bentonite, from 0.5 to 0.9 percent water, and 0.5 to 0.8 percent ethylene glycol produces a cast slug from which the resulting forgings are very smooth, and contain no ruptures or tears in the surface. In addition, the casting produced with this type of molding mixture evidences no subsurface slag inclusions or other nonmetallic discontinuities.

For best results, it is also important to charge the furnace properly in melting the valve steel to obtain a minimum variation in chemical analysis from heat to heat. The particular order in which we prefer to operate is to first add all of the free carbon, all of the steel scrap, all of the ferrochrome, all of the ferrosilicon and all of the ferromanganese. Then, the furnace is filled with the valve alloy scrap. The balance of the scrap is added as required to keep the furnace full. After the bath is molten, the foundry returns are added slowly to prevent freezing of the surface. Deoxidation of the melt is accomplished by plunging metallic aluminum in the bath. It was learned from observation that with relatively high manganese and silicon alloys, with temperatures above approximately 2650°F., there was the formation of a low melting double oxide of manganese and silicon which appeared as very small slag inclusions. A sufficient amount of the slag remained in suspension to render the castings unusable. Since most of the oxygen content of the double oxide originally was dissolved oxygen in the molten bath, it was necessary to remove the dissolved oxygen before the bath temperature reached a value of 2650°F. It was found that metallic aluminum introduced into the bath at temperatures between 2550°F. and 2625°F. would deoxidize the bath and form an aluminum oxide which was both light and solid and which immediately rose to the surface where it could be removed. After the initial deoxidation at 2600°F., additional aluminum must be added during the course of the melt to remove the oxygen picked up from the atmosphere above the melt. The aluminum should be added only as needed to avoid putting an excessive amount of aluminum in the bath and possibly causing precipitation of aluminum nitride. The appearance of a carbon boil provided a reliable indicator of the need for aluminum addition. Since carbon lies between manganese and silicon on the one hand, and aluminum on the other in the energy of formation of the oxide, the formation of carbon monoxide bubbles showed that all of the aluminum had been oxidized and more was needed to prevent the formation of the silicon and manganese oxides.

The mold configuration and method of introducing the molten metal into the mold form two more important aspects of the present invention. The mold configuration has three requirements. First, the slugs cast in it have to be sound; second, the casting efficiency, i.e., the ratio of weight of the slugs cast to the total weight of the metal in the melt, has to be high; and third, the mold should be relatively easy to make and assemble. With these thoughts in mind, a mold of the type shown in FIG. 3 has been developed and used for casting the slugs.

Referring to FIG. 3, the mold assembly generally indicated at reference numeral 22 consists of a stacked arrangement of individual pairs of molds at which lower mold section 23 and upper mold section 24 are typical. The lower mold section 23 contains a runner 26 while the upper mold section 24 contains a casting cavity 27 with the reduced area ingate 28 for each casting cavity. Thus, molten metal is introduced from the bottom upwardly through the restricted area ingate 28 to fill the casting cavity 27.

The stacked array of mold assemblies 22 is fed by means of a tapered downsprue 29 which feeds a cross runner 31 formed in the bottom section 32 of the mold assembly. The cross runner 31 feeds molten metal upwardly into an upsprue 33, which, in turn, feeds four main runners 34 disposed in an X pattern. These main runners 34 then feed the individual runners 26 of the individual mold assemblies. With this type of design, the lengths of the runners are more nearly equalized, and the temperature gradients existing in the molding system are at a minimum. Surplus metal remaining after filling of the molding cavity forms a riser 36 centrally of the stacked molds.

While it is undesirable to have too large an ingate area because of the amount of metal wasted, it is also undesirable to have too small an ingate because this produces large shrink cavities within the slug. Either type of variation could result in pipe in the stem portion of the valve when the slug is forged. After considerable experimentation, we determined that the dimensions of the components of the runner system could be properly based upon the following empirical formulae:

$$t = 0.6\sqrt{W} \quad (1)$$

$$A = \frac{W}{dtC\sqrt{2gH}}$$

where:
$t$ = optimum pour time in seconds.
$W$ = total weight of metal poured in mold.
$A$ = cross-sectional area of choke in bottom of downsprue.
$d$ = density of the metal.
$C$ = dimensionless constant (typically 0.85).
$g$ = acceleration due to gravity.
$H$ = effective height of ferrostatic head.

Using these parameters, i.e., a controlled melting schedule, a specific deoxidation procedure, and the improved moldmaking material described previously, it was found that the mold could be easily prepared incorporating an efficient runner and gating system and, by pouring the metal at the proper rate, cast slugs could be produced which can be forged into improved automotive poppet valves.

The specific configuration of the slug is important for several particulars. The chamfer which is included in the cast structure acts as a seating face to orient the slug in forging. This permits placing the slug where the most homogeneous metal can make the head of the valve which is exposed to the maximum stress and temperature conditions. The ingate area becomes the stem of the valve and this is rendered more ductile in the forging operation.

Particularly good results are obtained when the slugs are cast under conditions of chill casting. To accomplish this, the top of the molding cavity (the portion which forms the cylindrical end of the slug), can be fitted with a chill plate such as an iron or copper plate. Using this type of assembly, the dendrite structure is refined, and the head portion of the valve is provided with a substantially columnar structure which has excellent creep resistance.

The cast slugs produced according to the above-described process also evidence much less segregation. As a measure of segregation, measurement on the secondary dendrite arm spacing was carried out in the slug castings according to the technique described by Wallace et al. "Control of Cast Grain Size" published by the U.S. Army Materials Agency, Watertown, Massachusetts, as technical reference 0AMRA-CR 64-04/1964. The dendrite arms in the cast slug were determined to be about 0.00125 inches in size and the casting made with conventional cooling procedures, and as low as 0.0001 to 0.0005 inches when the chill plate was used in the casting cavity.

Figure 4:
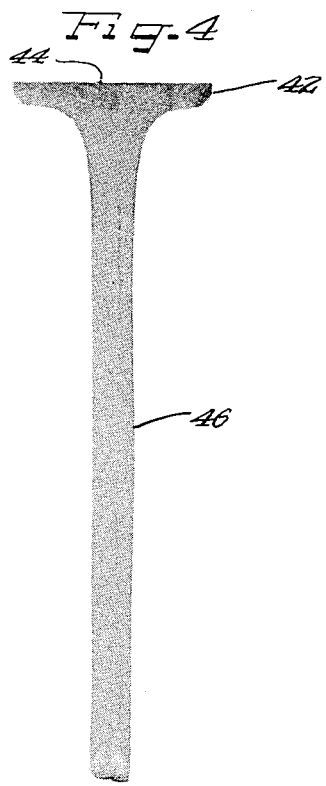
FIG. 4 is an actual photographic reproduction of the microstructure of a poppet valve produced according to the present invention.
Figure 5:
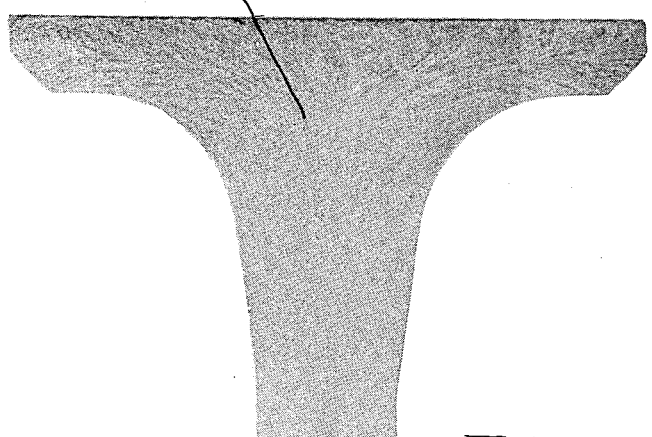
FIG. 5 is a photographic reproduction on an enlarged scale of the microstructure of the top of the head of the valve.

The metallurgical structure of the finished forged valve is illustrated in the photographic reproduction of FIGS. 4 to 8, inclusive. FIG. 4 is a photographic reproduction of the entire cross section of the valve, while FIG. 5 is a photographic reproduction of the macrostructure at the top of the valve. It will be noted from FIG. 5 that the center of the head portion indicated at reference numeral 41 consists of columnar-type grains which have been proven to have excellent creep resistance.

Figure 6:
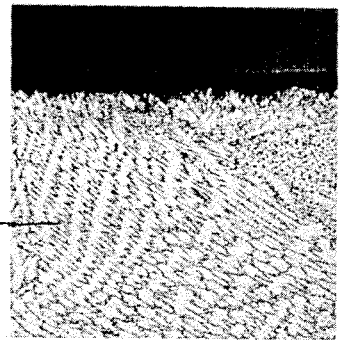
FIG. 6 is a photographic reproduction of the microstructure occurring at the outer diameter of the valve head in the area of the seating face.
Figure 7:
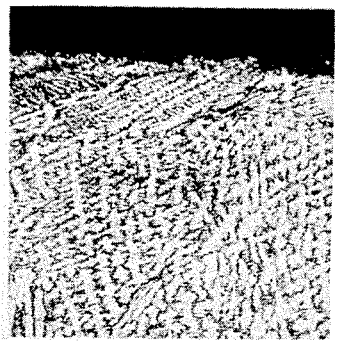
FIG. 7 is a photographic reproduction of the microstructure of the valve at the top of the head, in the central portion thereof.

FIG. 6 is an enlarged photomicrograph taken along the top of the outer diameter of the head at a location indicated at reference numeral 42 in FIG. 4. This structure embodies a combination of cast and wrought structures.

Figure 8:
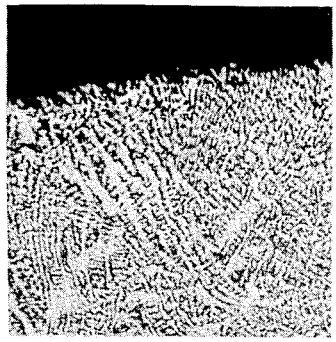
FIG. 8 is a photographic reproduction of the microstructure of the stem of the valve at the periphery thereof.

At the top of the head center, in a location identified at reference numeral 44 in the drawings, the as cast structure of the original slug is only slightly distorted. In FIG. 8, which was taken along the center of the stem at approximately the location indicated by reference numeral 46, the microstructure evidences a generally wrought-type structure which is quite ductile.

The process described above has several important advantages over the manufacture of valves in the more conventional manner. For one, a more uniform grain flow pattern is developed in forging because the possibily of slug misalignment is eleminated. Furthermore, the seam-free outer surface of the cast slug does not produce the typical head burst common to the cut wrought slugs when forged. In addition, a cast slug does not have the usual decarburized surface that is prevalent in wrought slugs. This decarburized low strength surface would impair fatigue properties in a finished part, particularly at elevated temperatures. Finally, a cast slug having a chemistry equivalent to a cut wrought slug has improved high temperature mechanical properties.

In the matter of metallurgical properties, the stem portion of the valves of the present invention have an average grain size in the range from about 6 to 8 on the ASTM scale in the extruded condition or with extrusion followed by aging. The wrought structure, after aging at 1400°F. for 10 hours evidences an elongation of at least 15 percent at room temperature, and typically has an elongation of 20 percent. A cast structure of the same alloy evidences an elongation of about 6 percent at room temperature.

The head portion, containing the essentially cast structure, is characterized by the presence of from 50 to 400 grains per square inch, and by a secondary dendrite arm spacing of no more than about 0.06 millimeters. The cast structure of the head has a rupture life of at least 1000 hours at an applied stress of 15,000 p.s.i. at 1350°F., and usually the value is about 1250 hours. A wrought structure of the same alloy has a rupture life of about 120 hours under these conditions.

Where the stem strength properties are particularly important, we recommend that the stem be subjected to a solution and age treatment. Solutioning at temperatures of 2000°F. to 2300°F. and aging at 1300° to 1600°F. has been found to increase the yield strength by a factor of about 20 percent. Such heat treatment serves to modify the grain size in the stem to the range of 3 to 6 on the ASTM scale.

The chemistry of the valve alloy is not critical for the purposes of the present invention, as any austenitic alloy which has high temperature strength and corrosion resistance can suitably be employed. A discussion of suitable valve materials will be found in the "Metals Handbook", Volume 1, 8th Edition, the chapter entitled "The Selection of Material for Engine valves", pages 626 et seq., and in patent such as U.S. Pat. Nos. 2,495,731; 2,602,738; and 2,657,130 assigned to Armco Steel Corp.

It should be evident that various modifications can be made to the described embodiment without departing from the scope of the present invention.

We claim:

1. A one piece poppet valve for an internal combustion engine consisting of an austenitic steel having a stem portion having a wrought type structure characterized by an elongation of at least 15 percent at room temperature, a head portion whose center has essentially a cast structure, said cast structure having a rupture life of at least 1000 hours at an applied stress of 15,000 p.s.i. at 1350°F., and said valve having a seat portion in which the microstructure is partly cast and partly wrought.

2. The valve of claim 1 in which said wrought type structure has an average grain size of from 6 to 8 on the ASTM scale.

3. The valve of claim 1 in which said wrought type structure has an average grain size of from 3 to 6 on the ASTM scale.

4. The valve of claim 1 in which said cast structure contains from 50 to 400 grains per square inch.

5. The valve of claim 1 in which said cast structure has a secondary dendrite arm spacing of no more than about 0.06 millimeters.

6. A poppet valve for an internal combustion engine consisting of an austenitic steel having a stem portion having a wrought type structure characterized by an average grain size of from 6 to 8 on the ASTM scale, said wrought structure being capable of an elongation of at least 15 percent at room temperature, a head portion whose center has essentially a cast structure containing from 50 to 400 grains per square inch, the cast structure being further characterized by a secondary dendrite arm spacing of no more than about 0.06 millimeters, said cast structure having a rupture life of at least 1000 hours at an applied stress of 15,000 p.s.i. at 1350°F., said valve having a seat portion in which the microstructure is partly cast and partly wrought.